US008339477B2

United States Patent
Chen

(10) Patent No.: US 8,339,477 B2
(45) Date of Patent: Dec. 25, 2012

(54) DIGITAL CAMERA CAPABLE OF DETECTING NAME OF CAPTURED LANDMARK AND METHOD THEREOF

(75) Inventor: Chih-Chung Chen, Chiayi (TW)

(73) Assignee: Altek Corporation, Hsinchu (TW)

( * ) Notice: Subject to any disclaimer, the term of this patent is extended or adjusted under 35 U.S.C. 154(b) by 382 days.

(21) Appl. No.: 12/650,599

(22) Filed: Dec. 31, 2009

(65) Prior Publication Data

US 2011/0080501 A1    Apr. 7, 2011

(30) Foreign Application Priority Data

Oct. 7, 2009   (TW) ............................... 98134042 A

(51) Int. Cl.
*H04N 5/76* (2006.01)
(52) U.S. Cl. .................................................. 348/231.3
(58) Field of Classification Search ............... 348/231.3, 348/231.5, 333.02, 345, 113; 382/224; 701/207
See application file for complete search history.

(56) References Cited

U.S. PATENT DOCUMENTS

| 6,657,661 | B1 | 12/2003 | Cazier | |
|---|---|---|---|---|
| 2005/0046706 | A1* | 3/2005 | Sesek et al. ................ | 348/231.3 |
| 2005/0270387 | A1* | 12/2005 | Watanabe et al. ........ | 348/240.99 |
| 2007/0088497 | A1* | 4/2007 | Jung ............................. | 701/207 |
| 2010/0053371 | A1* | 3/2010 | Karimoto ................... | 348/231.3 |

* cited by examiner

*Primary Examiner* — Chieh M Fan
*Assistant Examiner* — Akshay Trehan
(74) *Attorney, Agent, or Firm* — Morris Manning & Martin LLP; Tim Tingkang Xia, Esq.

(57) ABSTRACT

A digital camera capable of detecting a name of a captured landmark is described. The digital camera includes an environmental condition capturer, a liquid crystal display (LCD) unit, and a map data table. The map data table includes a plurality of landmark names and a plurality of landmark coordinates corresponding to the landmark names. A method for detecting the name of the captured landmark using by the digital camera includes the steps of capturing an image, and obtaining a focusing distance, in which the image includes at least one of the captured landmark; capturing an environmental condition including shooting information and searching information; obtaining a search focus range according to the environmental condition and the focusing distance; and looking up the map data table according to the search focus range and the shooting information to obtain an output coordinate and the landmark name corresponding to the captured landmark.

10 Claims, 10 Drawing Sheets

DIGITAL CAMERA CAPABLE OF DETECTING NAME OF CAPTURED LANDMARK AND METHOD THEREOF

CROSS-REFERENCE TO RELATED APPLICATIONS

This non-provisional application claims priority under 35 U.S.C.§119(a) on patent application No(s). 098134042 filed in Taiwan, R.O.C. on Oct. 7, 2009, the entire contents of which are hereby incorporated by reference.

BACKGROUND OF THE INVENTION

1. Field of Invention

The present invention relates to a digital camera, and more particularly to a digital camera capable of detecting a name of a captured landmark and a method thereof.

2. Related Art

Nowadays, digital cameras have become the mainstream image-capturing devices for capturing images, which are easy to operate and convenient for users to record every details of daily life. As the digital camera does not require any photographic film, the user basically can capture a large number of images at will. However, when the user reviews previously taken photos, he/she may forget or hardly remember locations and names of landmarks captured in the photos, thereby resulting in difficulty in organizing and sorting the photos.

Therefore, in U.S. Pat. No. 6,657,661, a global position system (GPS) receiver is combined with a digital camera. When capturing an image, the combined device writes location information of the camera at the moment of capturing the image into the image data according to longitude and latitude information obtained by the GPS. Moreover, in the digital image captured by the digital camera, in addition to the information of the image itself, other information when the image is captured may be further recorded in the image in an exchangeable image file format (EXIF). Through the EXIF, shooting time, aperture value, and exposure time when the image is captured may be recorded in the image, and information such as longitude and latitude obtained by the GPS may also be recorded in the image.

However, when the image is captured, the location information acquired by the GPS is coordinates of the location of the camera. Even if the location information where the image is captured has been recorded in the image, the problem that the user cannot figure out the name of the captured landmark still exits. What's worse, the location of the captured landmark is sometimes different from the location of the camera, so that the location data of the camera, rather than that of the captured landmark, is recorded. For example, if a photo of Taipei 101 is taken at Taipei City Hall, the captured landmark "Taipei 101" cannot be recorded in the photo, but instead, Taipei City Hall is recorded.

SUMMARY OF THE INVENTION

In view of the above problems, the present invention is a digital camera capable of detecting a name of a captured landmark and a method thereof, which are applicable to solve the above problems.

A digital camera capable of detecting a name of a captured landmark disclosed by the present invention is used for capturing an image of a scene. The digital camera comprises: an environmental condition capturer, for outputting shooting information of an environmental condition of the digital camera; a storage unit, for storing a map data table, in which the map data table comprises a plurality of landmark names and a plurality of landmark coordinates corresponding to the landmark names, and each of the landmark coordinate comprises a landmark longitude, a landmark latitude, and a landmark altitude; an image capturing element, for outputting image data; an optical element assembly, for controlling the image capturing element to receive searching information of the scene; and a controller.

According to the present invention, when the controller is actuated, the controller controls the optical element assembly and receives the image data from the image capturing element. The controller captures the environmental condition and a focusing distance, sets a search focus range according to the focusing distance, and then looks up the map data table for at least one of the corresponding landmark name according to the environmental condition, the searching information, and the search focus range. Then, the controller outputs the found landmark name. The digital camera further comprises a liquid crystal display (LCD) unit for displaying the found landmark name.

According to an embodiment of the present invention, the controller controls the optical element assembly according to the focusing distance. The optical element assembly of the digital camera comprises a lens device and an aperture device, and the image capturing element comprises a charge-coupled device (CCD).

In addition, the environmental condition capturer comprises: a GPS element, for outputting a shooting coordinate of the digital camera, in which the shooting coordinate comprises a shooting longitude, a shooting latitude, and a shooting altitude; a compass, for outputting a shooting direction of the digital camera; and an angle capturer, for outputting a shooting angle of the digital camera. The above shooting information of the environmental condition comprises the shooting coordinate, the shooting direction, and the shooting angle, and the searching information comprises a horizontal search angle and a vertical search angle.

A method for detecting a name of a captured landmark disclosed by the present invention is applicable to the digital camera. The digital camera comprises the environmental condition capturer, the LCD unit, and the map data table. The map data table comprises the plurality of landmark names and the plurality of landmark coordinates corresponding to the landmark names. The method for detecting the name of the captured landmark comprises: capturing the image, and obtaining the focusing distance, in which the image comprises at least one of the captured landmark; capturing the environmental condition, in which the environmental condition comprises shooting information and searching information; obtaining the search focus range according to the environmental condition and the focusing distance; and looking up the map data table according to the search focus range and the shooting information to obtain an output coordinate corresponding to the captured landmark and the landmark name corresponding to the output coordinate.

According to the present invention, the step of looking up the map data table according to the search focus range and the shooting information to obtain the output coordinate corresponding to the captured landmark and the landmark name corresponding to the output coordinate comprises: calculating a shooting axis according to the shooting direction and the shooting angle; obtaining a shooting pyramid according to the shooting axis, the horizontal search angle, and the vertical search angle; defining search pyramid ranges according to the search focus range and the shooting pyramid; looking up the map data table for the output coordinate according to each of the search pyramid ranges and the shooting coordinate; and looking up the map data table for the landmark name corresponding to the output coordinate.

The step of looking up the map data table for the output coordinate according to each of the search pyramid ranges and the shooting coordinate comprises: Step a, looking up the map data table for at least one of the landmark coordinate located within the search pyramid range according to the search pyramid range and the shooting information; Step b, when only one of the landmark coordinate is found within the search pyramid range, taking the found landmark coordinate as the output coordinate; Step c, when more than one of the landmark coordinates is found within the search pyramid range, selecting the output coordinate from the found landmark coordinates according to the found landmark coordinates, a shooting focal length, the focusing distance, and the shooting information; and Step d, when none of the landmark coordinate is found within the search pyramid range, performing the following steps: setting another search pyramid range according to the search focus range and the search pyramid range; and returning to Step a, and looking up the map data table for the landmark coordinate located within the another search pyramid range according to the another search pyramid range and the shooting information.

According to an embodiment of the present invention, the step of selecting the output coordinate from the found landmark coordinates according to the found landmark coordinates, the shooting focal length, the focusing distance, and the shooting information comprises: when the focusing distance is infinite, performing the following steps: respectively calculating a horizontal angle between a vector formed from the shooting coordinate towards each of the found landmark coordinates and the shooting direction; respectively calculating a vertical angle between the vector formed from the shooting coordinate towards each of the found landmark coordinates and the shooting direction; calculating a landmark angle sum of the horizontal angle and the vertical angle corresponding to each of the landmark coordinate; and taking the landmark coordinate corresponding to a minimum landmark angle sum as the output coordinate; and when the focusing distance is not infinite, performing the following steps: calculating a landmark distance from each of the found landmark coordinates to the shooting coordinate; and taking the landmark coordinate corresponding to a minimum landmark distance as the output coordinate.

According to another embodiment of the present invention, the step of selecting the output coordinate from the found landmark coordinates according to the found landmark coordinates, the shooting focal length, the focusing distance, and the shooting information further comprises: displaying the landmark names corresponding to the landmark coordinates on the LCD unit to allow a user to select a specified landmark name; and receiving a select command, and taking the landmark coordinate corresponding to the specified landmark name as the output coordinate.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Detailed features and advantages of the present invention are described in the embodiments below, which are sufficient for those skilled in the art to understand the technical content of the present invention and to implement the present invention accordingly. According to the content disclosed in the specification, the claims, and the drawings, those skilled in the art can easily understand the objects and advantages of the present invention.

Figure 1:
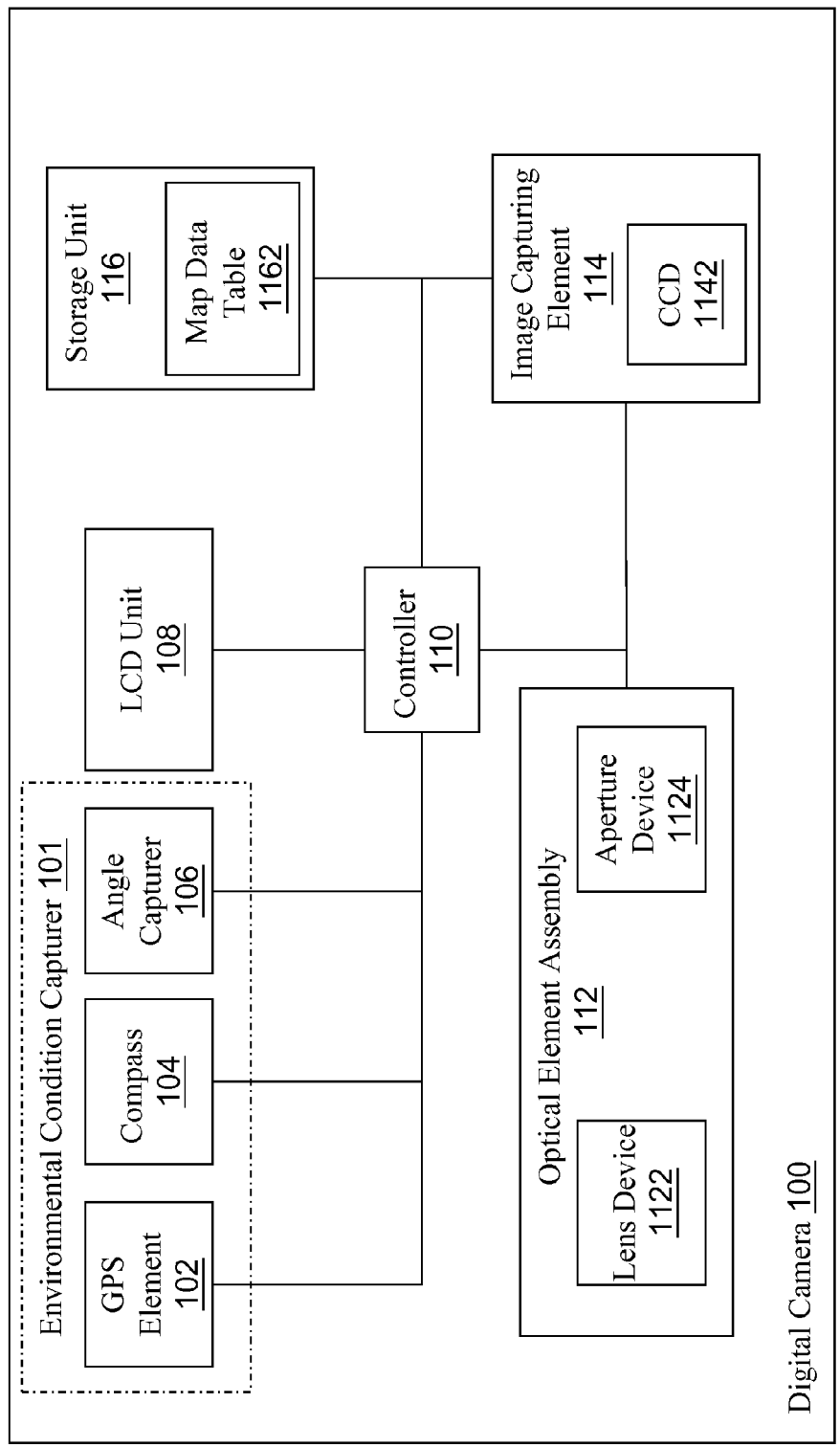
FIG. 1 is a schematic architectural view of a digital camera according to the present invention.

The present invention provides a digital camera capable of detecting a name of a captured landmark. FIG. 1 is a schematic architectural view of a digital camera according to the present invention. Referring to FIG. 1, the digital camera 100 comprises a controller 110, an environmental condition capturer 101, an LCD unit 108, an optical element assembly 112, an image capturing element 114, and a storage unit 116. The environmental condition capturer 101 comprises a GPS element 102, a compass 104, and an angle capturer 106. According to the present invention, the optical element assembly 112 comprises a lens device 1122 and an aperture device 1124, and the image capturing element 114 comprises a CCD 1142. The light reflected by the scene enters the image capturing element 114 through the lens device 1122 and the aperture device 1124, and is recorded in the storage unit 116.

According to the present invention, through the elements in the digital camera 100, the controller 110 may acquire information when an image is captured, and record the information into the image. The GPS element 102 comprises an antenna and a GPS receiver, and is enabled to receive a signal transmitted from a GPS satellite, so as to obtain necessary location information. The GPS element 102 outputs a shooting coordinate representing a location of the digital camera 100, and the shooting coordinate comprises a shooting longitude, a shooting latitude, and a shooting altitude.

Figure 2A:
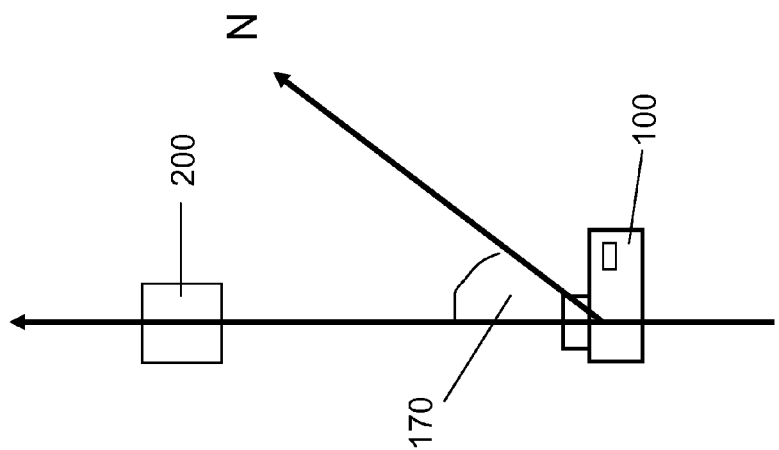
FIG. 2A is a top view of a shooting operation according to an embodiment of the present invention.

FIG. 2A is a top view of a shooting operation according to an embodiment of the present invention. Referring to FIG. 2A, the compass 104 outputs a shooting direction 170 of the digital camera 100. The shooting direction 170 is an angle between a vector formed from the digital camera 100 towards a captured object 200 and a direction from the digital camera 100 towards true north. The shooting direction 170 affects images of scenes that can be captured by the digital camera 100. The compass 104 may be an electronic compass, a north finder, or other devices that enable the controller 110 to acquire the shooting direction 170.

Figure 2B:
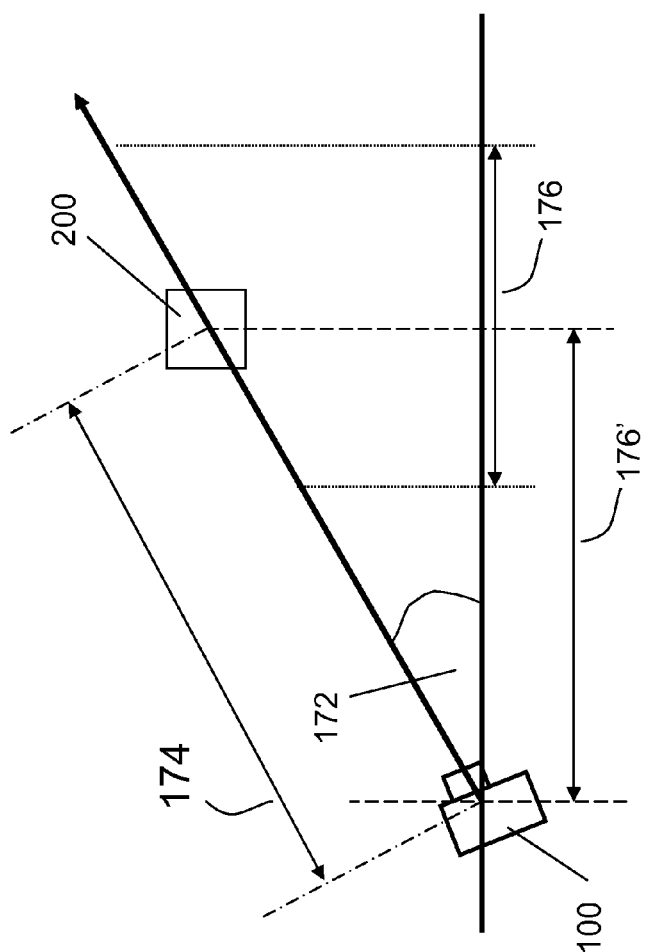
FIG. 2B is a side view of a shooting operation according to an embodiment of the present invention.

FIG. 2B is a side view of a shooting operation according to an embodiment of the present invention. Referring to FIG. 2B, the angle capturer 106 outputs a shooting angle 172 of the digital camera 100. The shooting angle 172 is an angle between a vector formed from the digital camera 100 towards the captured object 200 and a horizontal line when the image is captured. The shooting angle 172 affects images of scenes that can be captured by the digital camera 100. In addition, if the image is captured in an overlooking manner towards a direction below the horizontal line, the shooting angle 172 is represented by a negative number, and is used for subsequent calculation.

The LCD unit 108 is used for displaying the captured image and information associated with the captured image to a user. Shooting parameters such as an aperture value or the shooting coordinate of the digital camera 100, or the operation result obtained by the controller 110 may all be displayed to the user through the LCD unit 108.

The optical element assembly 112 comprises the lens device 1122 and the aperture device 1124, and is used for capturing an image according to an aperture value and a shooting focal length, a focusing distance 174, and other shooting parameters specified by the controller 110. The image capturing element 114 comprises the CCD 1142, and is used for converting an image frame into a digital image signal. The shooting focal length refers to a distance from an optical center of the lens device 1122 to the CCD 1142. The shooting focal length is determined by a designer when designing the lens device 1122, in which a longer focal length is corresponding to a narrower viewing angle (telephoto), and a shorter focal length is corresponding to a wider viewing angle (wide-angle). Some zoom lens devices 1122 may adjust a position of the lens before capturing an image, so as to change the focal length. The focusing distance 174 refers to a distance from the optical center of the lens device 1122 to the captured object, which is generally specified by an auto-focusing mechanism of the camera.

When capturing an image, the user may adjust the shooting focal length by the controller 110. During focusing, the controller 110 moves the lens device 1122 to a specified focusing distance 174, and adjusts the aperture device 1124. The image capturing element 114 is corresponding to the optical element assembly 112 and converts the image frame of the current scene into an electrical signal of a digital image. The controller 110 transmits the image signal generated by the image capturing element 114 to the storage unit 116.

The storage unit 116 in the digital camera 100 according to the present invention comprises a map data table 1162. The map data table 1162 comprises information associated with a plurality of landmarks. A landmark is a building or a natural object with unique geographical features in a certain place, so that tourists or other common people can recognize the place where they have been according to a photo of the landmark. The landmarks comprise, for example, Taipei 101, Grand Hotel, and Jade Mountain Main Peak in Taiwan, and the Tokyo Tower, the Singapore Merlion, and the Roman Colosseum (Italy) in foreign countries. Landmark information applicable to the present invention is not limited to locations or types of the landmarks, but the landmarks may be classified in the map data table 1162 according to regions or landmark features. In the map data table 1162, each landmark is corresponding to a landmark name and a landmark coordinate recorded, and the landmark coordinate comprises a landmark longitude, a landmark latitude, and a landmark altitude.

When the controller 110 in the digital camera 100 disclosed by the present invention is actuated, the controller 110 controls the optical element assembly 112 and receives image data from the image capturing element 114. The controller 110 may also capture necessary information through the above elements, so as to detect the name of the captured landmark. The controller 110 captures an environmental condition and a focusing distance 174, and sets a search focus range 176 according to the focusing distance 174. The environmental condition comprises shooting information and searching information. The shooting information comprises the shooting direction 170, the shooting angle 172, and the shooting coordinate; and the searching information comprises a horizontal search angle and a vertical search angle. Then, the controller 110 looks up the map data table 1162 for at least one of the landmark name according to the shooting direction, the shooting angle 172, a horizontal angle, a vertical angle, the shooting coordinate, and the search focus range 176, and outputs the found landmark name. A method for detecting a name of a captured landmark is described in detail below.

Figure 4:
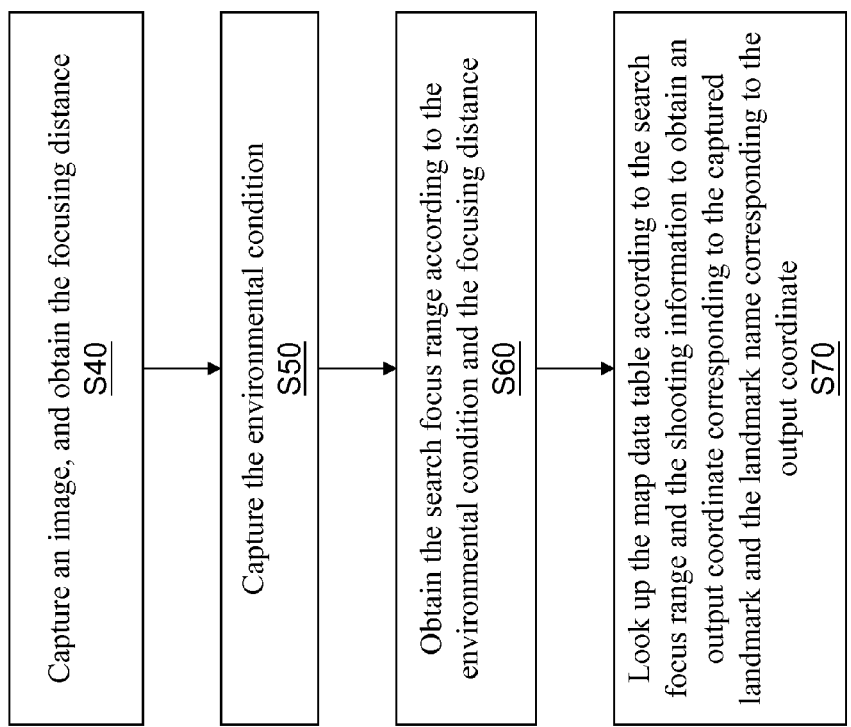
FIG. 4 is a schematic flow chart of a method for detecting a name of a captured landmark according to an embodiment of the present invention.

FIG. 4 is a schematic flow chart of a method for detecting a name of a captured landmark according to an embodiment of the present invention. As seen from FIG. 4, the method for detecting the name of the captured landmark comprises: in Step S40, capturing an image, and obtaining the focusing distance; in Step S50, capturing the environmental condition; in Step S60, obtaining the search focus range according to the environmental condition and the focusing distance; and in Step S70, looking up the map data table according to the search focus range and the shooting information to obtain an output coordinate corresponding to the captured landmark and the landmark name corresponding to the output coordinate.

The digital camera 100 sets the shooting focal length and the focusing distance 174, and captures an image in Step S40. The shooting focal length is generally selected by the user, in which a longer focal length is corresponding to a telephoto effect (narrower viewing angle), and a shorter focal length is corresponding to a wide-angle effect (wider viewing angle). The zoom range varies with the usage of different lenses. The setting of the focusing distance 174 generally comprises the following steps: the focusing distance 174 of the captured object is obtained by an auto-focusing mechanism of the digital camera 100, and the controller 110 controls the lens device 1122 to set the focusing distance 174 and then captures an image. After the image is captured, in Step S50, the digital camera 100 obtains the shooting information and the searching information of the environmental condition through capturing and computing operations by the GPS element 102, the compass 104, and the angle capturer 106 of the environmental condition capturer 101, that is, obtains the shooting information such as the shooting direction 170, the shooting angle 172, and the shooting coordinate, as well as the horizontal search angle and the vertical search angle. The capturing of the horizontal search angle and the vertical search angle will be described in detail below.

In Step S60, a search focus range 176 is calculated according to the environmental condition and the focusing distance 174, in which the search focus range 176 is used for setting a search range when searching the landmarks in the captured image. The manners for calculating the search focus range 176 according to the focusing distance 174 are described as follows. In a first manner, the focusing distance 174 is taken as a reference, and the search focus range 176 is obtained by increasing or decreasing the focusing distance 174 by a specified distance. Reference is made to FIG. 2B at the same time. For example, when the focusing distance 174 is 5 m, and the specified distance is 3 m, the search focus range 176 is a length range between a position 2 m (5−3) away from the digital camera 100 and a position 8 m (5+3) away from the digital camera 100. Alternatively, the focusing distance 174 is merely increased by the specified distance, without being decreased. At this time, the search focus range 176 is a length range between a position 5 m away from the digital camera 100 and a position 8 m away from the digital camera 100. Definitely, in the manner of increasing or decreasing the focusing distance 174 by the specified distance, the value of the specified distance may also vary with the focusing distance 174. For example, if the focusing distance 174 is rather short, the specified distance is short; and if the focusing distance 174 is quite long (for example, infinite), the specified distance is long.

In addition, in another manner of specifying the search focus range 176 by taking the focusing distance 174 as the reference, a horizontal distance between the digital camera 100 and the captured object 200 may be set as the search focus range 176. When the horizontal distance between the digital camera 100 and the captured object 200 is taken as a search focus range 176', the search focus range 176' may be calculated according to the focusing distance 174 and the shooting angle 172 by using the following equation:

Search focus range=focusing distance*Cos(shooting angle)

The above manner of obtaining the search focus range 176' according to the focusing distance 174 is applicable when the focusing distance 174 is a certain value. When the focusing distance 174 is infinite, another manner may be adopted, that is, a length may be directly preset in the digital camera 100 to serve as the search focus range 176. The preset length serving as the search focus range 176 may be set according to a hardware capability of the digital camera 100. That is to say, when the searching operation of the controller 110 of the digital camera 100 is simulated, a search range that is covered when the controller 110 operates for no more than 0.5 seconds is taken to define the preset length. In such a manner, the search range achieved each time is affected by the operation capability of the controller 110 and the capacity of the storage unit 116. The higher the hardware capability of the digital camera 100 is, the larger the search range will be achieved, and accordingly, the larger the search focus range 176 corresponding to the search range will be.

Figure 3:
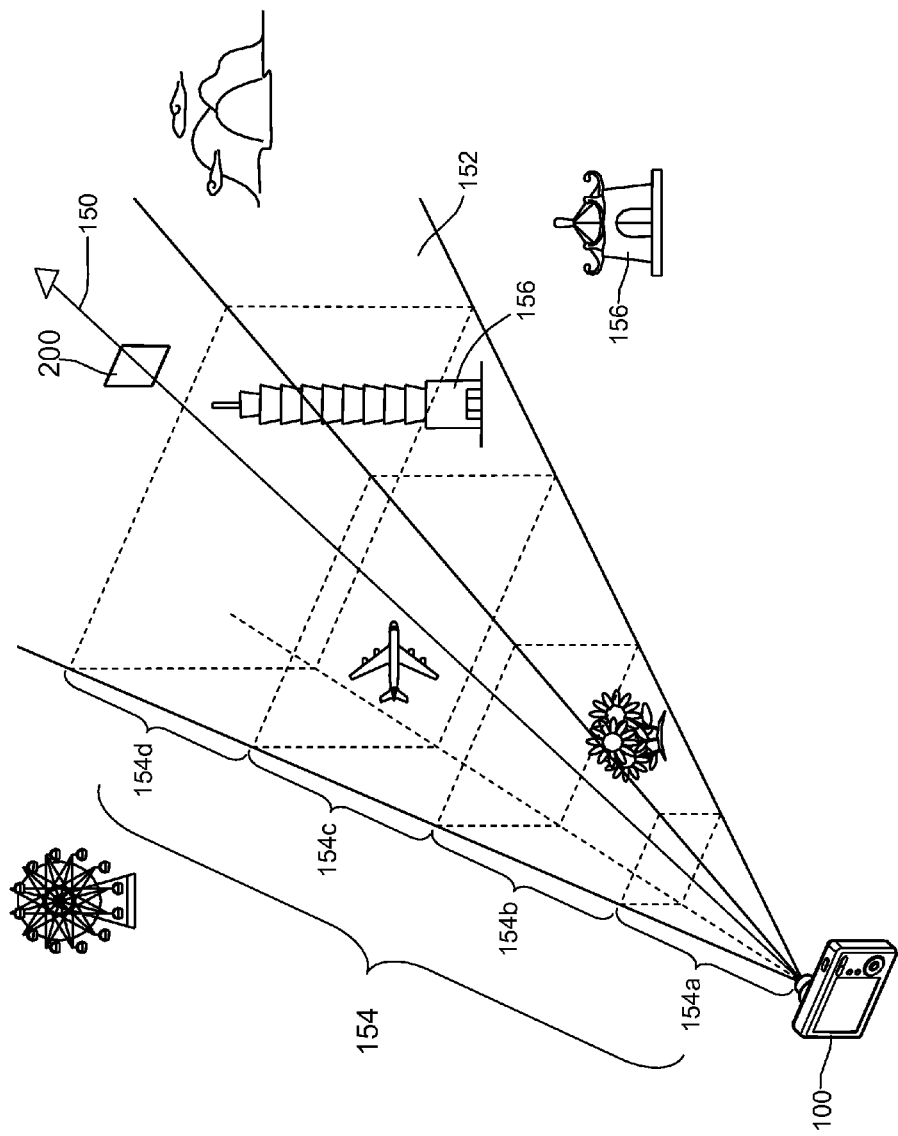
FIG. 3 is a schematic view of a shooting pyramid according to an embodiment of the present invention.

Then, in Step S70 of "looking up the map data table according to the search focus range and the shooting information to obtain the output coordinate corresponding to the captured landmark and the landmark name corresponding to the output coordinate", a scene range (covering the captured landmark) of the image that can be captured by the digital camera 100 when capturing the image is calculated according to the shooting information and the search focus range 176, and then the map data table 1162 is looked up for a landmark coordinate located within the scene range and the landmark name corresponding to the output coordinate. The scene range of the image that can be captured is a square pyramid with the digital camera 100 as an apex, which is referred to as a shooting pyramid herein. FIG. 3 is a schematic view of a shooting pyramid according to an embodiment of the present invention. As seen from FIG. 3, a shooting axis 150 extends from the digital camera 100 towards the captured object 200. By taking the shooting axis 150 as a center, together with the horizontal search angle and the vertical search angle of the digital camera 100 when capturing the image, the shooting pyramid 152 is obtained. The shooting pyramid 152 may be divided into a plurality of search pyramid ranges 154a, 154b, 154c, and 154d. Each search pyramid range 154 is the above search range. Then, the search focus range 176 and the shooting coordinate are compared with landmark coordinates 156 in the map data table, so as to search the landmark coordinate 156 located within the shooting pyramid 152. Finally, an output coordinate and a landmark name corresponding to the output coordinate are output according to the found landmark coordinate 156. The specific implementation of Step S70 is described in detail below.

Figure 5:
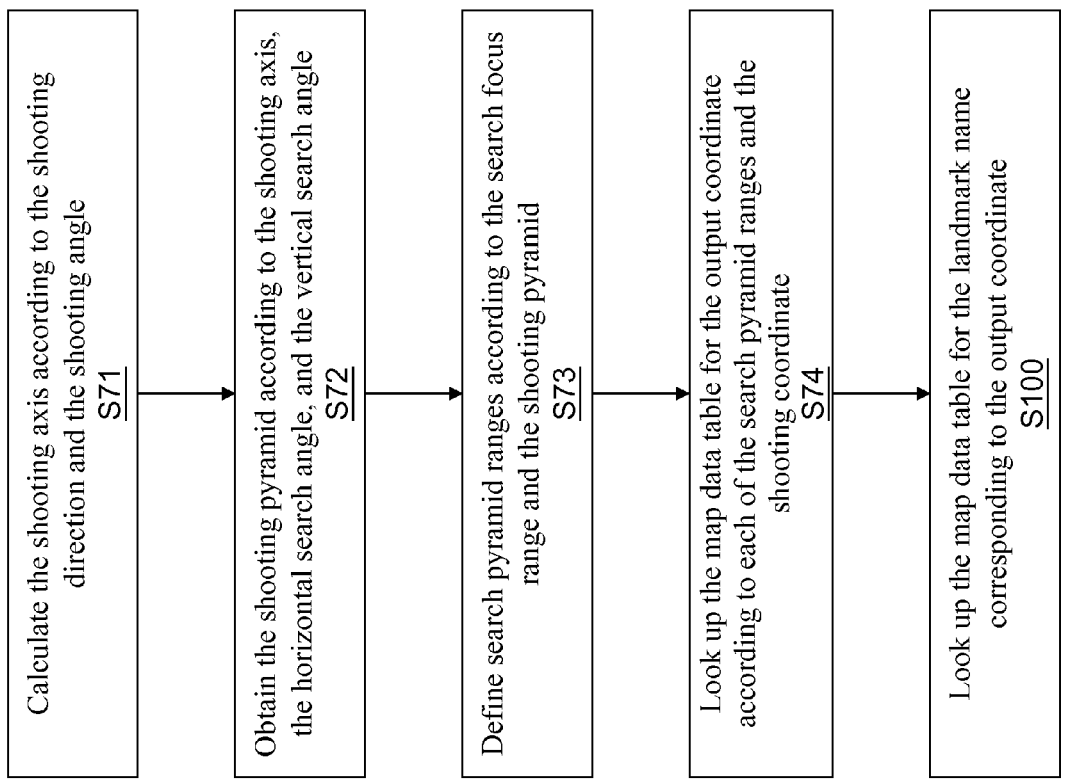
FIG. 5 is a schematic flow chart of Step S70 according to an embodiment of the present invention.

FIG. 5 is a schematic flow chart of Step S70 according to an embodiment of the present invention. As seen from FIG. 5, the step of looking up the map data table according to the search focus range and the shooting information to obtain the output coordinate comprises: in Step S71, calculating the shooting axis according to the shooting direction and the shooting angle; in Step S72, obtaining the shooting pyramid according to the shooting axis, the horizontal search angle, and the vertical search angle; in Step S73, defining search pyramid ranges according to the search focus range and the shooting pyramid; in Step S74, looking up the map data table for the output coordinate according to each of the search pyramid ranges and the shooting coordinate; and in Step S100, looking up the map data table for the landmark name corresponding to the output coordinate.

In Step S71, the shooting axis 150 in FIG. 3 is calculated according to the shooting direction 170 in FIG. 2A and the shooting angle 172 in FIG. 2B. The shooting axis 150 is a vector formed from the shooting coordinate of the digital camera 100 towards the captured object 200, in which the shooting coordinate of the digital camera 100 acts as a point of origin. The shooting axis 150 is a central axis of the shooting pyramid 152 representing the scene range that can be captured when capturing the image.

Figure 6:
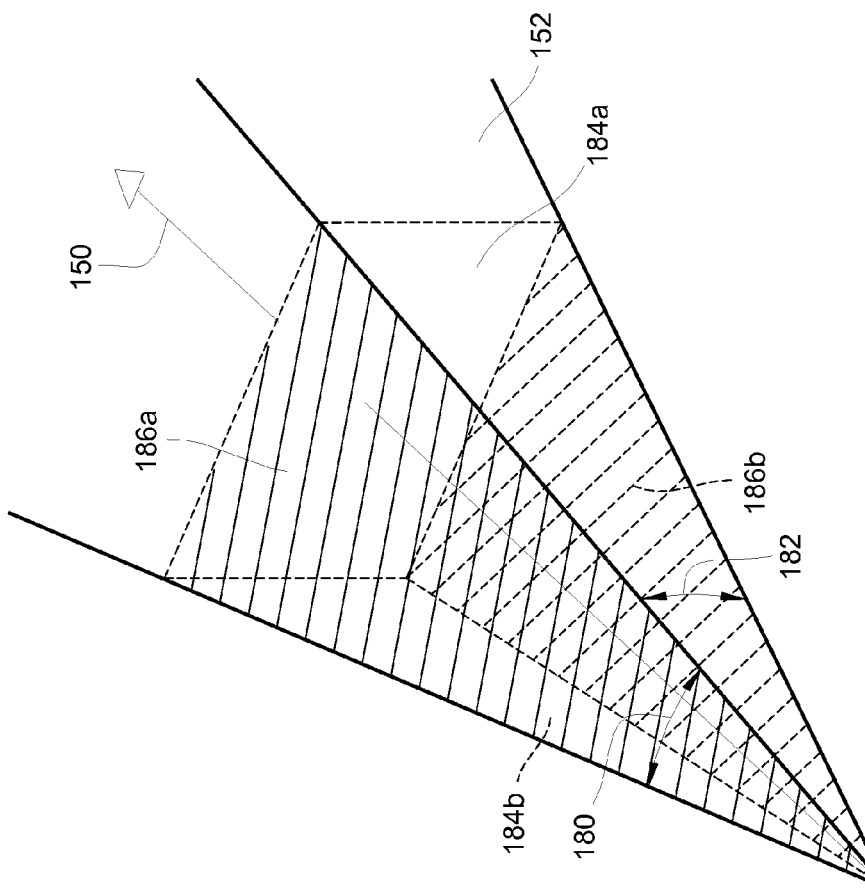
FIG. 6 is a schematic view of a relation between a shooting axis and a shooting pyramid according to an embodiment of the present invention.

In Step S72, the shooting pyramid 152 is obtained according to the shooting axis 150, the horizontal search angle, and the vertical search angle. FIG. 6 is a schematic view of a relation between a shooting axis and a shooting pyramid according to an embodiment of the present invention. Referring to FIG. 6, when the horizontal search angle 180 is out-stretched towards the horizontal direction by taking the shooting axis 150 as a center, two horizontal limiting planes 184a and 184b are formed. When the vertical search angle 182 is out-stretched towards the vertical direction by taking the shooting axis 150 as a center, two vertical limiting planes 186a and 186b are formed.

The horizontal search angle 180 and the vertical search angle 182 are viewing angles of the digital camera 100 when capturing an image. The viewing angles are associated with the shooting focal length (f), a horizontal amplitude ($L_h$) and a vertical amplitude ($L_v$) of the photosensitive element. A manner of obtaining the viewing angles is described as follows.

The shooting focal length (f) is a distance from an optical center of the lens to the photosensitive element.

The horizontal amplitude ($L_h$) is a width of the photosensitive element.

The vertical amplitude ($L_v$) is a height of the photosensitive element.

The horizontal viewing angle may be calculated according to f and $L_h$ by using the following equations:

$$\tan(\theta_h/2)=(L_h/2)/f \qquad \text{(Equation 1)}$$

$$\theta_h=2*\tan^{-1}((L_h/2)/f) \qquad \text{(Equation 2)}$$

$$\tan(\theta_v/2)=(L_v/2)/f \qquad \text{(Equation 3)}$$

$$\theta_v=2*\tan^{-1}((L_v/2)/f) \qquad \text{(Equation 4)}$$

Here, $\theta_h$ represents a horizontal viewing angle, and $\theta_v$ represents a vertical viewing angle. Equation 1 is transposed to obtain Equation 2, and the viewing angle $\theta_h$ in Equation 2 is corresponding to the horizontal search angle. Equation 3 is transposed to obtain Equation 4, and the viewing angle $\theta_v$ in Equation 4 is corresponding to the vertical search angle 182.

The controller 110 substitutes the shooting parameters and the amplitude of the CCD 1142 into the above equations, so as to obtain the corresponding horizontal search angle 180 and vertical search angle 182.

As for the horizontal search angle 180 and the vertical search angle 182, in addition to the above real-time calculation manner, viewing-angle lookup tables (that is, a horizontal-angle lookup table and a vertical-angle lookup table) corresponding to different focal lengths may be built in the digital camera 100, so as to avoid the viewing-angle calculation performed each time, thereby reducing the operation. According to another embodiment of the present invention, the digital camera 100 may also directly specify a preset value as the horizontal search angle 180 and the vertical search angle 182 for searching the landmark coordinates 156.

After the horizontal search angle 180 and the vertical search angle 182 are obtained, in Step S72, the shooting pyramid 152 is calculated according to the shooting axis 150, the horizontal search angle 180, and the vertical search angle 182.

In Step S73, the search pyramid ranges 154 are defined according to the search focus range 176 and the shooting pyramid 152 of Step S72, such that the controller 110 successively searches the landmark coordinates 156. Referring to FIG. 3, in this embodiment, the shooting pyramid 152 is cut into a plurality of search pyramid ranges 154*a*, 154*b*, 154*c*, and 154*d* with an equal longitudinal length according to the length of the search focus range 176, so as to sequentially look up the map data table 1162 for the landmark coordinates 156 in the search pyramid ranges 154. However, according to the present invention, the manner of cutting the shooting pyramid 152 into the search pyramid ranges 154 is not limited, and the search pyramid ranges 154 may have different longitudinal lengths. When searching the landmark coordinates 156, the searching sequence of the search pyramid ranges 154 is not limited to 154*a*, 154*b*, 154*c*, and 154*d*, but other searching sequences may also be used, for example, 154*a*, 154*c*, 154*b*, and 154*d*.

In Step S74, after the range required to be sequentially searched is determined according to the search pyramid ranges 154 and the shooting coordinate, the map data table 1162 is looked up to determine whether there is any landmark coordinate 156 located within the search pyramid ranges 154. The search pyramid ranges 154 are sequentially searched till at least one of the landmark coordinate 156 is found and taken as the output coordinate. Then, the map data table 1162 is looked up, and a landmark name corresponding to the output coordinate is output.

Figure 7:
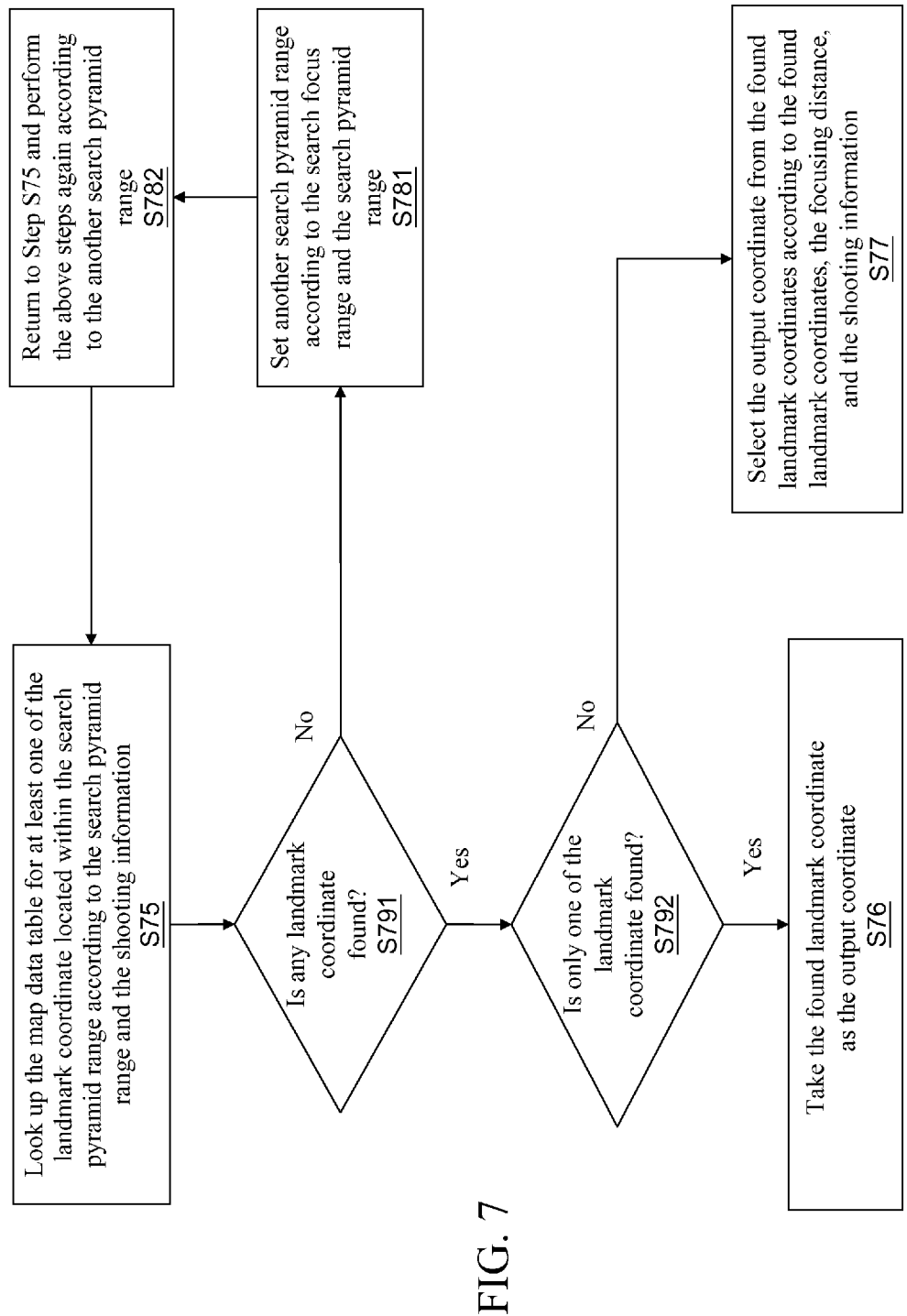
FIG. 7 is a schematic flow chart of Step S74 according to an embodiment of the present invention.

The manner of searching the landmark coordinates 156 in the search pyramid ranges 154 may be obtained with reference to FIG. 7. FIG. 7 is a schematic flow chart of Step S74 according to an embodiment of the present invention. As seen from FIG. 7, the manner of searching the landmark coordinates 156 in the search pyramid ranges 154 comprises: in Step S75, looking up the map data table for at least one of the landmark coordinate located within the search pyramid range according to the search pyramid range and the shooting information (Step a); in Step S791, determining whether any landmark coordinate is found; in Step S792, determining whether only one of the landmark coordinate is found; in Step S76, taking the found landmark coordinate as the output coordinate (Step b); in Step S77, selecting the output coordinate from the found landmark coordinates according to the found landmark coordinates, the focusing distance, and the shooting information (Step c); in Step S781, setting another search pyramid range according to the search focus range and the search pyramid range; and in Step S782, returning to Step S75 (that is, Step a), and performing the above steps again according to the another search pyramid range.

In Step S75, the map data table 1162 is looked up according to the shooting information and the search pyramid range 154 to determine whether there is any landmark coordinate 156 located within the search pyramid range 154. Referring to FIG. 3, the shooting pyramid 152 and the search pyramid ranges 154 are relative ranges defined by taking the shooting coordinate as a point of origin, and in the searching process, the actual coordinate ranges of the search pyramid ranges 154 are obtained according to the shooting coordinate. After the actual ranges represented by the search pyramid ranges 154 are obtained, the ranges are searched according to the landmark coordinates 156 of the landmarks in the map data table 1162. Although both the shooting coordinate and the landmark coordinates 156 are represented by latitude, longitude, and altitude, when a distance is calculated, the latitude and the longitude between the two places may be converted into an actual distance measured in meters or kilometers.

If it is determined through Step S791 and Step S792 that only one of the landmark coordinate 156 is found in the current search pyramid range 154, the landmark coordinate 156 found in the map data table 1162 is directly taken as the output coordinate in Step S76. Then, the landmark name corresponding to the output coordinate can be found subsequently according to the output coordinate, such that the landmark name may be written into the image file.

When a plurality of landmark coordinates 156 is found within one search pyramid range 154, in Step S77, calculation is performed according to the landmark coordinates 156 found in the map data table 1162 and the shooting information, so as to select a landmark coordinate from the found landmark coordinates 156 to serve as the output coordinate. The manner of selecting a landmark coordinate from the found landmark coordinates 156 to serve as the output coordinate will be described in detail below.

If no landmark coordinate 156 is found within the current search pyramid range 154, Step 78 (Step d) is performed, which comprises Step S781 and Step S782. Firstly, in Step S781, another new search pyramid range 154 is set according to the search focus range 176 and the current search pyramid range 154. The new search pyramid range 154 may be, but not limited to, a search pyramid range 154 adjacent to the originally-used search pyramid range 154 and far away from the digital camera 100.

After the new search pyramid range 154 is set, in Step S782, the map data table 1162 is looked up according to the new search pyramid range 154 and the shooting coordinate to determine whether there is any landmark coordinate 156 located within the new search pyramid range 154 (that is, the another search pyramid range 154). By successively searching the search pyramid ranges 154 using the above manner, at least one of the landmark coordinate 156 located within the shooting pyramid 152 can be found. The manner of defining the another search pyramid range 154 according to the current search pyramid range 154 may be taking a pyramid range farther (away from the location of the digital camera) than the current search pyramid range 154 as the another search pyramid range 154, or taking a pyramid range nearer than the current search pyramid range 154 as the another search pyramid range 154.

Figure 8A:
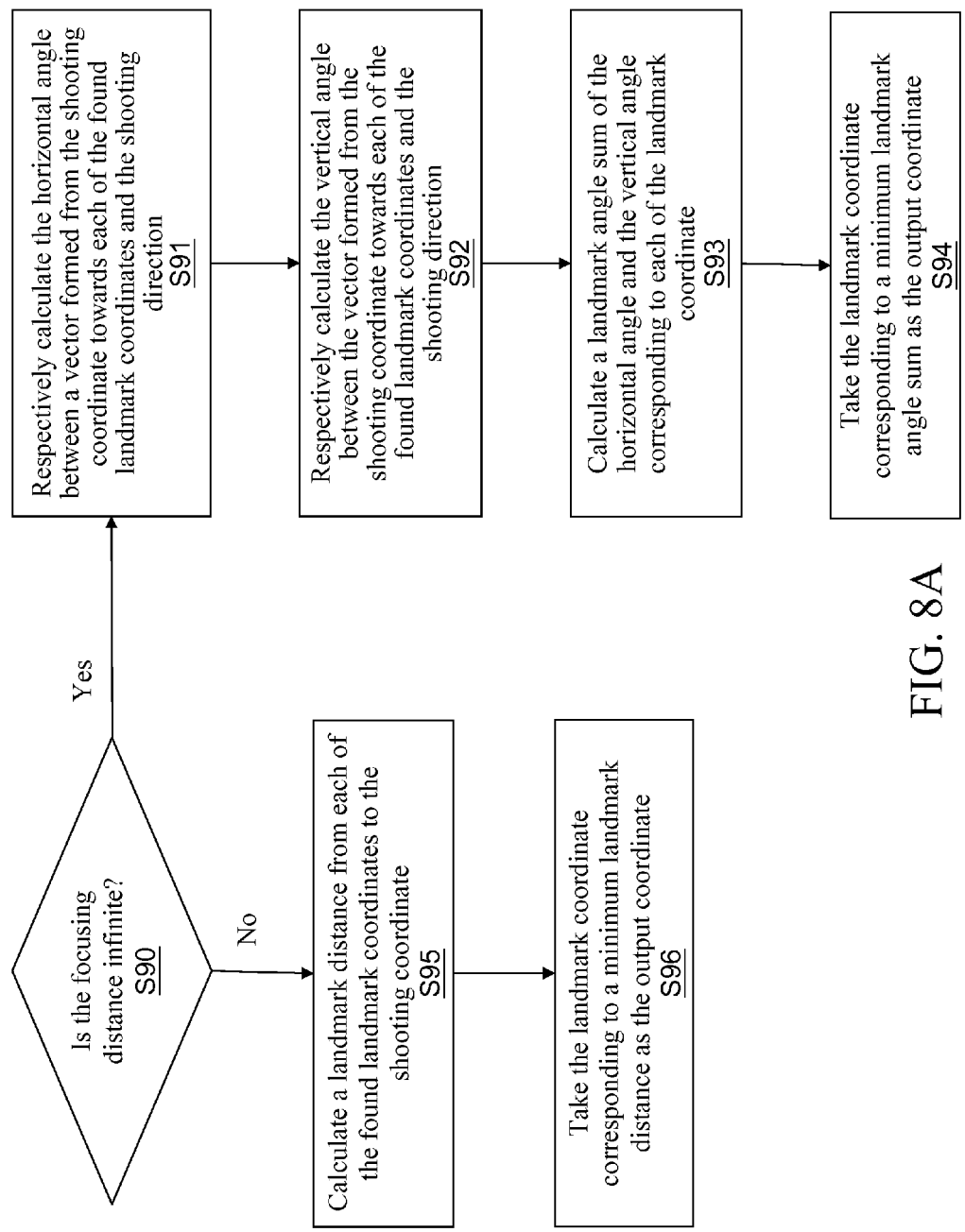
FIG. 8A is a schematic flow chart of a first embodiment of Step S77 according to an embodiment of the present invention.
Figure 8B:
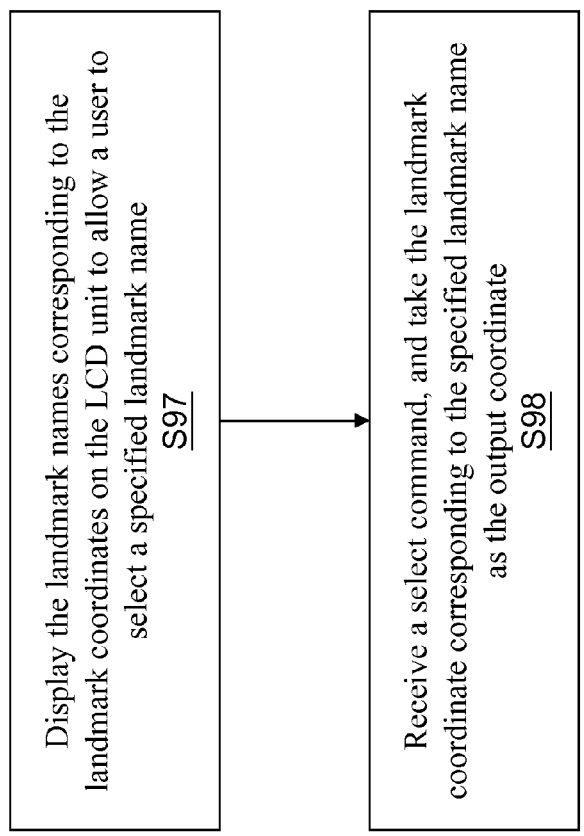
FIG. 8B is a schematic flow chart of a second embodiment of Step S77 according to an embodiment of the present invention.

The manner of selecting one of the landmark coordinate 156 as the output coordinate when more than one of the landmark coordinate 156 is found in the same search pyramid range 154 in the above process may be obtained with reference to FIGS. 8A and 8B. FIGS. 8A and 8B are respectively a schematic flow chart of a first embodiment and a schematic flow chart of a second embodiment of Step S77 according to an embodiment of the present invention. As shown in FIG. 8A, firstly, in Step S90, it is determined whether the focusing distance 174 is infinite. When the focusing distance 174 is not infinite, the manner of selecting the output coordinate comprises: in Step S95, calculating a landmark distance from each of the found landmark coordinates to the shooting coordinate; and in Step S96, taking the landmark coordinate corresponding to a minimum landmark distance as the output coordinate. When the focusing distance 174 is infinite, the manner of selecting the output coordinate comprises: in Step S91, respectively calculating the horizontal angle between a vector formed from the shooting coordinate towards each of the found landmark coordinates and the shooting direction; in Step S92, respectively calculating the vertical angle between the vector formed from the shooting coordinate towards each of the found landmark coordinates and the shooting direction; in Step S93, calculating a landmark angle sum of the horizontal angle and the vertical angle corresponding to each of the landmark coordinate; and in Step S94, taking the landmark coordinate corresponding to a minimum landmark angle sum as the output coordinate.

If the focusing distance 174 is not infinite, the captured landmark may be close to the digital camera 100. In Step S95, the landmark distance from the digital camera 100 to each of the found landmark coordinates 156 is calculated according to the shooting coordinate and each of the found landmark coordinates 156 using the Pythagorean Theorem. In Step S96, the landmark coordinate 156 having a minimum landmark distance is selected according to the obtained landmark distances, and taken as the output coordinate.

If the focusing distance 174 is infinite, the output coordinate is selected according to angles between the landmark coordinates 156 and the shooting direction. In Step S91, a horizontal angle between a vector formed from the shooting coordinate towards each of the landmark coordinate 156 and the shooting direction is calculated. In Step S92, a vertical angle between the vector formed from the shooting coordinate towards each of the landmark coordinate 156 and the shooting direction is calculated according to the shooting angle 172. The calculation may be performed using the following equations:

$$\alpha_{poi} = \tan^{-1}((X_{poi}-X)/(Y_{poi}-Y)) \quad \text{(Equation 5)}$$

$$\theta_{poi} = \theta_f - \alpha_{poi} \quad \text{(Equation 6)}$$

$$\beta_{poi} = \sin^{-1}((Z_{poi}-Z)/D_{poi}) \quad \text{(Equation 7)}$$

$$v_{poi} = v_f - \beta_{poi} \quad \text{(Equation 8)}$$

Here, $\alpha_{poi}$ represents a horizontal angle between each of the landmark coordinate 156 and the true north direction, $X_{poi}$ represents the landmark longitude in each of the landmark coordinate 156, X represents a shooting longitude in the shooting coordinate, $Y_{poi}$ represents the landmark latitude in each of the landmark coordinate 156, Y represents a shooting latitude in the shooting coordinate, $\theta_{poi}$ represents a horizontal angle between each of the landmark coordinate 156 and the shooting direction, $\theta_f$ represents the shooting direction, $\beta_{poi}$ represents an angle between each the landmark coordinate 156 and the horizontal line, $Z_{poi}$ represents the landmark altitude in each the landmark coordinate 156, Z represents a shooting altitude in the shooting coordinate, $D_{poi}$ represents a distance from each of the landmark coordinate 156 to the shooting coordinate, $v_{poi}$ represents a vertical angle between each of the landmark coordinate 156 and the shooting direction, and $v_f$ represents the shooting angle 172 (the shooting angle 172 may be, for example, an elevation angle represented by a positive value, or a depression angle represented by a negative value).

After substituting the shooting information and the landmark coordinates 156 into the above equations, the horizontal angle and the vertical angle between each of the landmark coordinate 156 and the shooting direction can be obtained. In Step S93, the horizontal angle and the vertical angle corresponding to each of the landmark coordinate 156 are added to obtain the landmark angle sum. The smaller the landmark angle sum of the landmark coordinate 156 is, the shorter the distance between the direction from the digital camera 100 towards the landmark coordinate 156 and the shooting direction will be. Therefore, in Step S94, the landmark coordinate 156 corresponding to a minimum landmark angle sum is selected as the output coordinate.

As shown in FIG. 8B, the manner of selecting one of the landmark coordinate 156 as the output coordinate further comprises: in Step S97, displaying the landmark names corresponding to the landmark coordinates on the LCD unit to allow the user to select a specified landmark name; and in Step S98, receiving a select command, and taking the landmark coordinate corresponding to the specified landmark name as the output coordinate.

If a plurality of landmark coordinates 156 is found in the same search pyramid range 154, in Step S97, the landmark names corresponding to the found landmark coordinates 156 are displayed to the user for reference, and in Step S98, a result input by the user is obtained for being provided to the digital camera 100 for being recorded. The landmark coordinates 156 displayed to the user for reference may be displayed after being sorted according to the landmark distances or the landmark angle sums, or displayed according to a sequence in which the landmark coordinates 156 are found.

According to the above steps, the search pyramid ranges 154 may be searched successively till the output coordinate is found. Most preferably, a searching boundary condition is set according to the image resolution when the landmark coordinates 156 are searched. The farther the captured object 200 is located, the smaller the number of pixels occupied by the captured object 200 in the image will be. However, due to the limitation of the resolution, when the captured object 200 is far enough from the digital camera 100, the captured object 200 only presents one pixel in the image, and if it is even farther from the digital camera 100, the captured object 200 is considered as invisible. Therefore, a searching distance limit may be set according to different resolutions, for example, a 10 m*10 m*10 m object may only be displayed as a distance of one pixel under this resolution. If no landmark coordinate 156 located within the shooting pyramid 152 can be found within the search distance limit, it is determined that no landmark coordinate 156 is located within the shooting pyramid 152, and no landmark name can be output.

According to an embodiment of the present invention, when the map data table 1162 stores a volume or shading area of each landmark, the operations performed in the searching process can be reduced. The shading area refers to an area of a scene behind the landmark that can be shaded by the landmark. When one of the landmark coordinate 156 is found in a certain search pyramid range 154, as the scene behind the landmark is shaded, the calculation of searching other landmark coordinates 156 does not need to be performed on the shaded portion in the search pyramid range 154.

In addition, the method according to the present invention can also be applied to search a name of a landmark seen by the user. The digital camera 100 dynamically captures images in real time, and displays the found landmark name on the LCD unit 108 by using the method for detecting the name of the captured landmark. The present invention is not limited to performing calculations on images that need to be stored, and it may be unnecessary to record the landmark name corresponding to the output coordinate into the image.

Even if the captured object 200 is not a landmark but a person, a landmark behind the person can also be found.

According to the digital camera capable of detecting the name of the captured landmark and the method thereof according to the present invention, the digital camera is a digital camera comprising the environmental condition capturer having the GPS element, the compass, and the angle capturer, the LCD unit, and the map data table. The landmark coordinate and corresponding landmark name of the captured landmark can be searched according to the focusing distance 174 and the shooting information captured by the environmental condition capturer, and then recorded into the image or provided to the user for reference.

What is claimed is:

1. A method for detecting a name of a captured landmark, adapted to a digital camera, wherein the digital camera comprises an environmental condition capturer, a liquid crystal display (LCD) unit, and a map data table, and the map data table comprises a plurality of landmark names and a plurality of landmark coordinates corresponding to the landmark names, the method comprising:

capturing an image, and obtaining a focusing distance, wherein the image comprises at least one of the captured landmark;

capturing an environmental condition by the environmental condition capturer, wherein the environmental condition comprises shooting information and searching information, the shooting information comprises a shooting direction, a shooting angle, and a shooting coordinate, and the searching information comprises a horizontal search angle and a vertical search angle;

obtaining a search focus range by increasing or decreasing the focusing distance by a specified distance, or by being set to a horizontal distance between the digital camera and a captured object; and looking up the map data table according to the search focus range and the shooting information to obtain an output coordinate corresponding to the captured landmark and the landmark name corresponding to the output coordinate, comprising:

calculating a shooting axis according to the shooting direction and the shooting angle;

obtaining a shooting pyramid according to the shooting axis, the horizontal search angle, and the vertical search angle;

defining a search pyramid range according to the search focus range and the shooting pyramid;

looking up the map data table for the output coordinate according to each of the search pyramid range and the shooting coordinate, comprising:

Step a: looking up the map data table for at least one of the landmark coordinate located within the search pyramid range according to the search pyramid range and the shooting information;

Step b: when only one of the landmark coordinates is found within the search pyramid range, taking the found landmark coordinate as the output coordinate;

Step c: when ones of the landmark coordinates is found within the search pyramid range, selecting the output coordinate from the found landmark coordinates according to the found landmark coordinates, the focusing distance, and the shooting information; and Step d: when none of the landmark coordinates is found within the search pyramid range, performing the following steps:

setting an another search pyramid range according to the search focus range and the search pyramid range; and returning to Step a, and looking up the map data table for the landmark coordinate located within the another search pyramid range according to the another search pyramid range and the shooting information; and looking up the map data table for the landmark name corresponding to the output coordinate.

2. The method for detecting the name of the captured landmark according to claim 1, wherein the step of selecting the output coordinate from the found landmark coordinates according to the found landmark coordinates, the focusing distance, and the shooting information comprises:

when the focusing distance is infinite, performing the following steps:

respectively calculating a horizontal angle between a vector formed from the shooting coordinate towards each of the found landmark coordinates and the shooting direction;

respectively calculating a vertical angle between the vector formed from the shooting coordinate towards each of the found landmark coordinates and the shooting direction;

calculating a landmark angle sum of the horizontal angle and the vertical angle corresponding to each of the landmark coordinate; and taking the landmark coordinate corresponding to a minimum landmark angle sum as the output coordinate; and when the focusing distance is not infinite, performing the following steps:

calculating a landmark distance from each of the found landmark coordinates to the shooting coordinate; and taking the landmark coordinate corresponding to a minimum landmark distance as the output coordinate.

3. The method for detecting the name of the captured landmark according to claim 1, wherein the step of selecting the output coordinate from the found landmark coordinates according to the found landmark coordinates, the focusing distance, and the shooting information further comprises:

displaying the landmark names corresponding to the landmark coordinates on the LCD unit to allow a user to select a specified landmark name; and receiving a select command, and taking the landmark coordinate corresponding to the specified landmark name as the output coordinate.

4. A digital camera capable of detecting a name of a captured landmark, applicable to capture an image of a scene, comprising:

an environmental condition capturer, for outputting shooting information of an environmental condition of the digital camera, wherein the shooting information comprises a shooting direction, a shooting angle, and a shooting coordinate;

a storage unit, for storing a map data table, wherein the map data table comprises a plurality of landmark names and a plurality of landmark coordinates corresponding to the landmark names, and each of the landmark coordinates comprises a landmark longitude, a landmark latitude, and a landmark altitude;

an image capturing element, for outputting image data;

an optical element assembly, for controlling the image capturing element to receive searching information of the scene, wherein the searching information comprises a horizontal search angle and a vertical search angle; and a controller, wherein when the controller is actuated, the controller controls the optical element assembly and receives the image data from the image capturing element; and the controller is adapted to perform:

capturing the environmental condition and a focusing distance;

setting a search focus range according to the focusing distance, wherein the search focus range is obtained by increasing or decreasing the focusing distance by a specified distance, or by being set to a horizontal distance between the digital camera and a captured object;

calculating a shooting axis according to the shooting direction and the shooting angle;

obtaining a shooting pyramid according to the shooting axis, the horizontal search angle, and the vertical search angle;

defining a search pyramid range according to the search focus range and the shooting pyramid;

looking up the map data table for the output coordinate according to each of the search pyramid range and the shooting coordinate, comprising:

Step a: looking up the map data table for at least one of the landmark coordinate located within the search pyramid range according to the search pyramid range and the shooting information;

Step b: when only one of the landmark coordinates is found within the search pyramid range, taking the found landmark coordinate as the output coordinate;

Step c: when ones of the landmark coordinates is found within the search pyramid range, selecting the output coordinate from the found landmark coordinates according to the found landmark coordinates, the focusing distance, and the shooting information; and Step d: when none of the landmark coordinates is found within the search pyramid range, performing the following steps:

setting an another search pyramid range according to the search focus range and the search pyramid range; and returning to Step a, and looking up the map data table for the landmark coordinate located within the another search pyramid range according to the another search pyramid range and the shooting information; and looking up the map data table for the landmark name corresponding to the output coordinate.

5. The digital camera capable of detecting the name of the captured landmark according to claim 4, wherein the environmental condition capturer comprises:

a global position system (GPS) element, for outputting the shooting coordinate of the digital camera, wherein the shooting coordinate comprises a shooting longitude, a shooting latitude, and a shooting altitude;

a compass, for outputting the shooting direction of the digital camera; and an angle capturer, for outputting the shooting angle of the digital camera, wherein the shooting information comprises the shooting coordinate, the shooting direction, and the shooting angle.

6. The digital camera capable of detecting the name of the captured landmark according to claim 4, wherein the controller controls the optical element assembly according to the focusing distance.

7. The digital camera capable of detecting the name of the captured landmark according to claim 4, wherein the optical element assembly comprises a lens device and an aperture device.

8. The digital camera capable of detecting the name of the captured landmark according to claim 4, wherein the image capturing element comprises a charge-coupled device (CCD).

9. The digital camera capable of detecting the name of the captured landmark according to claim 4, further comprising: a liquid crystal display (LCD) unit for displaying the landmark name.

10. A method for detecting a name of a captured landmark, adapted to a digital camera, wherein the digital camera comprises an environmental condition capturer, a liquid crystal display (LCD) unit, and a map data table, and the map data table comprises a plurality of landmark names and a plurality of landmark coordinates corresponding to the landmark names, the method comprising:

capturing an image, and obtaining a focusing distance, wherein the image comprises at least one of the captured landmark;

capturing an environmental condition by the environmental condition capturer, wherein the environmental condition comprises shooting information and searching information, the shooting information comprises a shooting direction, a shooting angle, and a shooting coordinate, and the searching information comprises a horizontal search angle and a vertical search angle;

obtaining a search focus range according to the environmental condition and the focusing distance; and looking up the map data table according to the search focus range and the shooting information to obtain an output coordinate corresponding to the captured landmark and the landmark name corresponding to the output coordinate, comprising:

calculating a shooting axis according to the shooting direction and the shooting angle;

obtaining a shooting pyramid according to the shooting axis, the horizontal search angle, and the vertical search angle;

defining a search pyramid range according to the search focus range and the shooting pyramid;

looking up the map data table for the output coordinate according to each of the search pyramid range and the shooting coordinate, comprising Step a, looking up the map data table for at least one of the landmark coordinate located within the search pyramid range according to the search pyramid range and the shooting information;

Step b, when only one of the landmark coordinate is found within the search pyramid range, taking the found landmark coordinate as the output coordinate;

Step c, when ones of the landmark coordinates is found within the search pyramid range, selecting the output coordinate from the found landmark coordinates according to the found landmark coordinates, the focusing distance, and the shooting information, comprising:

when the focusing distance is infinite, performing the following steps:

respectively calculating a horizontal angle between a vector formed from the shooting coordinate towards each of the found landmark coordinates and the shooting direction;

respectively calculating a vertical angle between the vector formed from the shooting coordinate towards each of the found landmark coordinates and the shooting direction;

calculating a landmark angle sum of the horizontal angle and the vertical angle corresponding to each of the landmark coordinate; and taking the landmark coordinate corresponding to a minimum landmark angle sum as the output coordinate; and when the focusing distance is not infinite, performing the following steps:

calculating a landmark distance from each of the found landmark coordinates to the shooting coordinate; and taking the landmark coordinate corresponding to a minimum landmark distance as the output coordinate; and Step d, when none of the landmark coordinate is found within the search pyramid range, performing the following steps:

setting an another search pyramid range according to the search focus range and the search pyramid range; and returning to Step a, and looking up the map data table for the landmark coordinate located within the another search pyramid range according to the another search pyramid range and the shooting information; and looking up the map data table for the landmark name corresponding to the output coordinate.

* * * * *